Nov. 27, 1951 J. WOLNY 2,576,742
SCREW HOLDING SCREW DRIVER
Filed Nov. 20, 1947
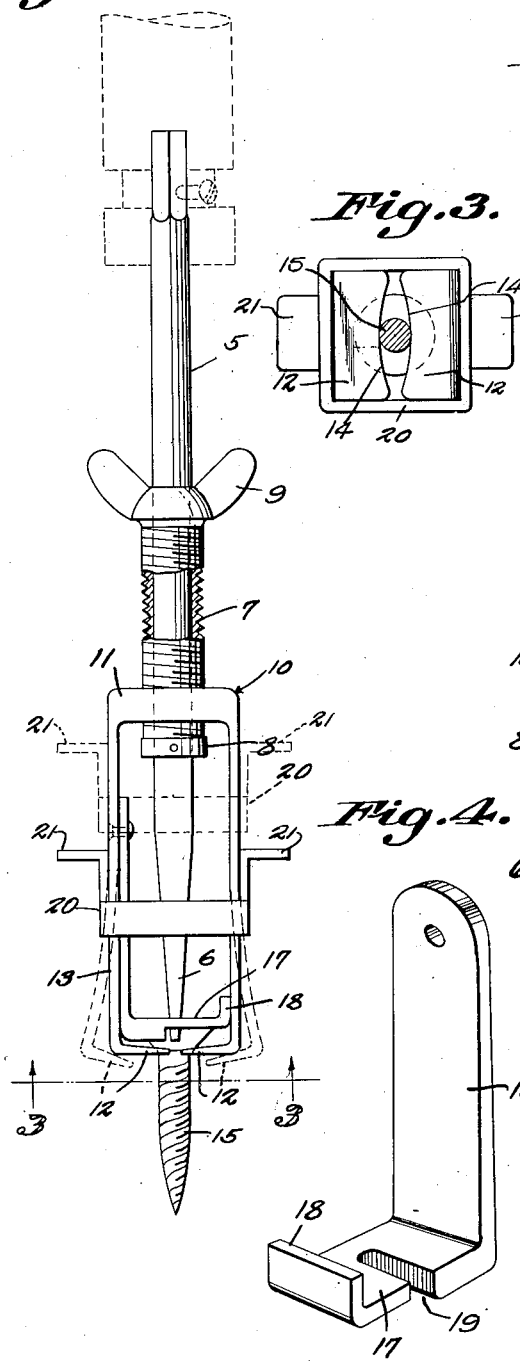
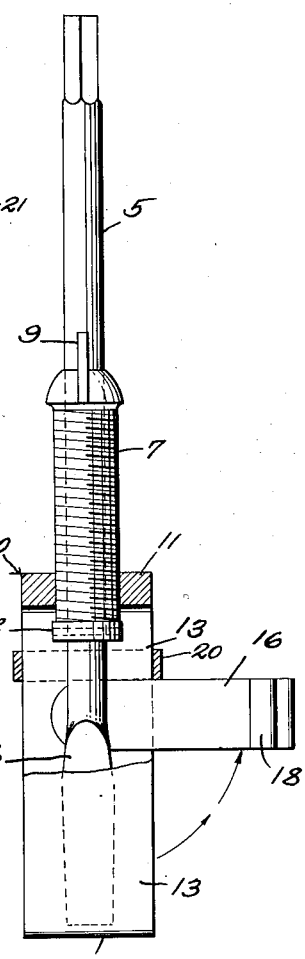
Joseph Wolny
INVENTOR
ATTORNEYS.

Patented Nov. 27, 1951

2,576,742

UNITED STATES PATENT OFFICE 2,576,742

SCREW HOLDING SCREW DRIVER

Joseph Wolny, Boulder, Colo.

Application November 20, 1947, Serial No. 787,094

2 Claims. (Cl. 145—52)

This invention relates to screw driver construction, the primary object of the invention being to provide a screw driver having screw engaging jaws which may be brought into clamping relation with a screw, whereby the screw will be firmly gripped and held, preventing slipping of the screw driver from the screw to distort the screw driver slot of the screw.

Another object of the invention is to provide means whereby a screw to be positioned, may be readily secured in position on the screw driver, the screw being held by the screw driver when positioning the screw in a restricted area where it is impossible to hold the screw with one hand while the screw driver is being operated.

Still another object of the invention is to provide a gripping member wherein one jaw thereof is wider than the adjacent jaw thereby adapting the screw gripping jaws for use in gripping the head of a screw wherein a portion of the head has been broken off.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a screw driver equipped with a screw gripping means, constructed in accordance with the invention.

Fig. 2 is a side elevational view thereof, a portion of one of the gripping jaws having been broken away.

Fig. 3 is a view taken on line 3—3 of Fig. 1.

Fig. 4 is a perspective view of the pivoted arm carried by the gripping jaws for preventing displacement of the screw driver blade with respect to the screw, during the act of setting the screw.

Referring to the drawing in detail, the reference character 5 indicates a screw driver shank and the reference character 6 indicates the blade formed at the lower end of the shank.

Positioned on the shank 5 of the screw driver, is a sleeve 7 which is formed with external threads, the sleeve being secured against movement longitudinally of the shank 5, by means of the collar 8 which is secured on the shank 5 and against which one end of the sleeve engages, the sleeve being provided with wings 9, whereby the sleeve may be rotated on the shank 5.

The reference character 10 indicates the attachment which embodies a head 11 formed with a threaded opening cooperating with the threads of the sleeve 7 in moving the attachment longitudinally of the sleeve to cause the jaws 12 thereof to grip the screw which is being rotated by the screw driver.

The jaws 12 are formed at the free ends of the yieldable arms 13, the jaws being extended inwardly towards each other and formed with curved inner edges 14 that fit around the curved surface of the screw. Thus it will be seen that due to this construction, the jaws 12 may be moved to closely engage that portion of the head of the screw that merges with the shank or threaded portion of the screw, as clearly shown by Fig. 1 of the drawing. It will, of course, be understood that the action of the jaws will be to draw the screw, which in the present showing is indicated by the reference character 15, into close engagement with the driver blade 6, where the screw will be firmly secured and held to the blade to permit the positioning of the screw in restricted areas, wherein it is impossible to hold the screw in its proper position with the fingers of one hand while the screw driver is being operated, to set the screw with the other hand.

In order that the blade 6 will be held against displacement with respect to the screw driver blade slot of the screw, a pivotal arm 16 is provided, which arm is secured to the inner surface of one of the jaws 13, the free end of the arm being extended inwardly at right angles, providing the stop 17, the stop 17 being formed with an upstanding flange 18 adapted to bear against the inner surface of the opposite jaw.

As shown by Fig. 1 of the drawing, this stop 17 is formed with a slot 19 extending inwardly from a side edge thereof, the slot being so arranged that it will align with the usual screw driver slot of the screw, so that the blade of the screw driver may be extended therethrough and held in position under the screw driver slot of the screw, by the stop 17.

This stop 17 is thicker at one side of the stop 17 than the other, with the result that the thick portion of the stop may be positioned against a mutilated screw head, that is wherein one portion of the screw head has become disconnected from the screw by excessive pressure having been directed to the screw head. By positioning the thick portion of the stop 17 over the recess formed by the mutilation of the screw head, in such a way that when the screw driver is being rotated to remove the screw, the screw driver blade will be held in close engagement with the walls of the slot of the screw and be prevented from slipping.

In order that the jaws 12 may be moved inwardly towards each other to clamp a screw at the head of the screw, a band 20 is provided, which band encircles the mutilated arms, to the end that when the band is moved upwardly to the dotted line position as shown by Fig. 1 of the drawings, the arms and jaws are free to flex outwardly, but when it is desired to move the jaws 12 into gripping relation with a screw head, the band 20 may be moved to the position shown in full lines in Fig. 1 of the drawings, thereby drawing the arms inwardly to cause the gripping of the screws. Finger pieces 21 are formed in the band 20 so that the band may be readily and easily operated as described.

In the use of the device the jaws 12 are positioned under the head of a screw to be positioned, and the band 20 is moved downwardly forcing the jaws into close engagement with the head of the screw to hold the head of the screw while it is being positioned. It will of course, be understood that the driver blade 6 is forced downwardly into the screw driver slot of the screw head and is held in place by rotating the sleeve 7 against the collar 8. With this structure there is no danger of the screw falling from the screw driver, regardless of the pressure which may be required to position the screw in a restricted area.

Should it be necessary to remove the screw after one-half of the head has been broken off, as frequently happens when excessive pressure is directed to a screw head, the pivoted arm 16 may be swung from the position shown by Fig. 2 of the drawing, to the position shown by Fig. 1, wherein the thickened portion of the stop 17 fits into the space from which the broken section of the head of the screw has been removed, the edge of the slot 19 providing the side of the screw driver slot of the head which has been broken off, to the end that the screw may now be rotated to remove the screw.

From the foregoing it will be seen that due to the construction shown and described, I have provided a screw driver having means whereby a screw may be positioned or removed, may be gripped by the screw driver in such a way that the shank of the screw driver will not slip or slide from the screw head when the screw driver is being rotated to accomplish its purpose. It will further be seen that I have provided a screw holder which may be readily secured to the screw driver and held in position while the screw driver is being used to set the screw in a restricted area.

Having thus described the invention, what is claimed is:

1. In a screw driver, a shank having a blade at one end thereof, a screw gripping member including yieldable arms, slidably mounted on the shank, opposed screw gripping jaws at the free ends of the arms, means for moving the screw gripping members longitudinally of the shank, an arm pivotally secured to the inner surface of one of said yieldable arms, one end of the pivoted arm being extended laterally over said jaws for engagement with the upper surface of a screw head, cooperating with the screw gripping arms in clamping the screw head, said end of the pivoted arm having a slot disposed inwardly from one edge thereof, through which the blade of the screw driver extends, whereby the screw driver blade is held within the slot of the screw held between the jaws.

2. In a screw driver, a shank having a blade at one end thereof, a screw gripping member including yieldable arms slidably mounted on the shank, opposed screw gripping jaws at the free ends of the arms, an arm pivotally secured to the inner surface of one of said yieldable arms, one end of the pivoted arm extending laterally overlying said jaws for engagement with the upper surface of a screw head, said laterally extended end of the pivoted arm having a slot through which the screw driver shank extends engaging the screw head held between the jaws, and being thicker at one side of the slot than at the opposite side thereof, the thick portion of the laterally extending end providing the side of a screw driver slot of a broken screw, against which the laterally extended end is positioned whereby said screw driver shank and broken screw held between the jaws, are rotated as the screw driver is rotated.

JOSEPH WOLNY.

REFERENCES CITED

The following references are of record in the file of this patent:

UNITED STATES PATENTS

| Number | Name | Date |
|---|---|---|
| 306,862 | Ricketts | Oct. 21, 1884 |
| 1,090,028 | Comb | Mar. 10, 1914 |
| 2,040,713 | Shaffer | May 12, 1936 |

FOREIGN PATENTS

| Number | Country | Date |
|---|---|---|
| 4,518 | Great Britain | Dec. 29, 1875 |